United States Patent [19]
Davis

[11] Patent Number: 4,823,214
[45] Date of Patent: Apr. 18, 1989

[54] DISK DRIVE FOR CARTRIDGE DISKS

[75] Inventor: Marvin B. Davis, Colorado Springs, Colo.

[73] Assignee: Laser Magnetic Storage International Company, Colorado Springs, Colo.

[21] Appl. No.: 122,795

[22] Filed: Nov. 19, 1987

Related U.S. Application Data

[62] Division of Ser. No. 777,814, Sep. 19, 1985.

[51] Int. Cl.$^4$ .................... G11B 17/02; G11B 15/18
[52] U.S. Cl. .................... 360/97.01; 360/99.06; 360/99.12; 369/77.2; 369/291
[58] Field of Search ............... 360/97–99, 360/96.5; 369/77.2, 291

[56] References Cited

U.S. PATENT DOCUMENTS

| | | | |
|---|---|---|---|
| 4,071,860 | 1/1978 | Watanabe et al. | 360/96.5 |
| 4,208,681 | 6/1980 | Hatchett | 360/97 |
| 4,410,971 | 10/1983 | Eiseman | 369/75 |
| 4,439,851 | 3/1984 | Kiguchi | 369/77.2 |
| 4,445,155 | 4/1984 | Takahashi | 360/99 |
| 4,445,157 | 4/1984 | Takahasi | 360/133 |
| 4,523,240 | 6/1985 | Dunstan et al. | 360/99 |
| 4,680,662 | 7/1987 | Fukusima et al. | 360/133 |
| 4,688,206 | 8/1987 | Nakagawa | 369/291 |

FOREIGN PATENT DOCUMENTS 86113850.1  4/1987  European Pat. Off. .
0244132  11/1987  European Pat. Off. .

Primary Examiner—John H. Wolff
Attorney, Agent, or Firm—Sheridan, Ross & McIntosh

[57] ABSTRACT

A disk drive includes a drive mechanism for engaging the disk of a disk cartridge. A support is provided to move the drive mechanism into engagement with the disk. Several alternative supports are disclosed, employing cam mechanisms to pivotally move the drive mechanism. Also, pins are provided to restrain the cartridge housing from movement while the support is operated. An actuator is provided to open the cartridge as it is inserted into the drive.

22 Claims, 5 Drawing Sheets

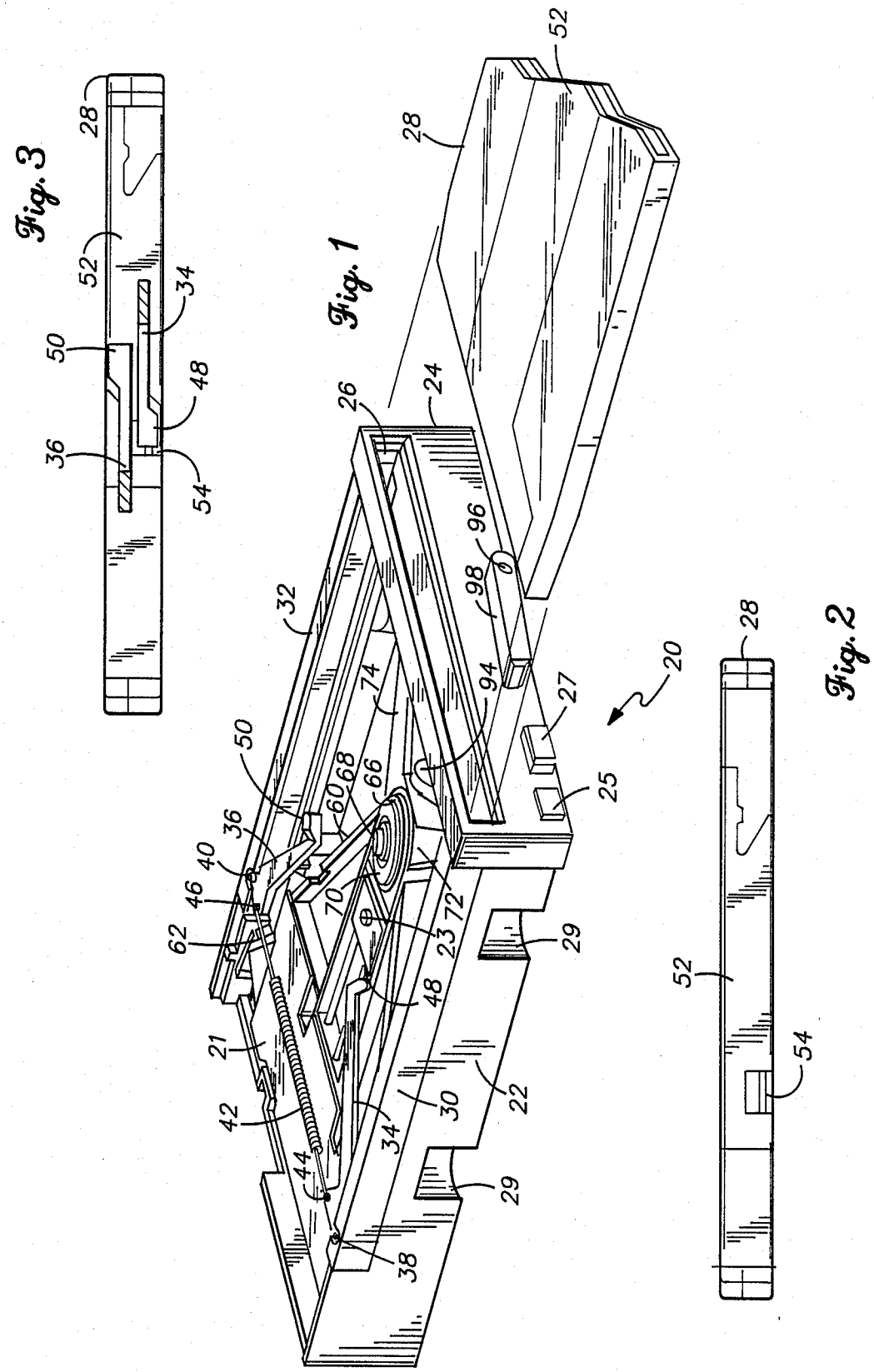

DISK DRIVE FOR CARTRIDGE DISKS

This is a division of application Ser. No. 777,814, filed Sept. 19, 1985.

This invention relates to disk drives, and particularly to disk drives used in computer applications. The invention is particularly useful in connection with cartridge disk drives of a compact nature, particularly optical drives.

Disk cartridges are well known in the computer arts. Basically, a disk cartridge comprises a cartridge housing containing a disk upon which data may be recorded. A door or slide is ordinarily provided in the cartridge housing which, when opened, permits access of the read and write mechanisms to the disk media to permit the recording or retrieving of data. The corresponding disk drive ordinarily includes a mechanism for opening the door or slide on the cartridge, and for engaging the disk within the cartridge to the spindle of a motor or other drive mechanism. The disk, when rotated by the drive mechanism, permits access of the disk media to the record or read mechanism.

In computer applications it is desirable to provide apparatus as compact and miniature as possible. However, physical constraints often limit the degree of compactness available to a given apparatus. Heretofore, cartridge disk drives have employed the principle of inserting the disk cartridge into the drive and moving the cartridge into engagement with a drive motor. For a cartridge approximately 6 inches square and ¼ inch thick (9 cu. in.), 36 cu. in. of space is required if the cartridge is to be moved ¾ inch. Thus, some 27 cu. in. are required within the disk drive merely to permit movement of the cartridge.

The present invention concerns a cartridge disk drive wherein the motor is moved to engage the cartridge, rather than the other way around. Thus, the present invention contemplates a disk drive having means for receiving and engaging the cartridge in a stationary position and means for moving the drive mechanism into engagement with the disk.

One feature of the present invention resides in the provision of a mechanism to open the slide door of the cartridge during insertion of the cartridge into the drive.

Another feature of the present invention resides in the provision of means to securely engage the disk to the drive mechanism.

Yet another but optional feature of the present invention resides in the provision of a door within the disk drive which closes the disk drive from external influences when the drive mechanism is brought into engagement with the disk.

The above and other features of this invention will be more fully understood from the following detailed description and the accompanying drawings, in which:

FIG. 1 is a perspective view, partly in cutaway cross-section, of a disk drive in accordance with the presently preferred embodiment of the present invention, a portion of a disk cartridge is illustrated for purposes of orientation;

FIGS. 2 and 3 are end views of a disk cartridge, illustrating the engagement of the cartridge door opening mechanism of the disk drive illustrated in FIG. 1;

Figure 10:
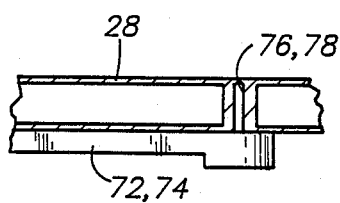
Figure 7:
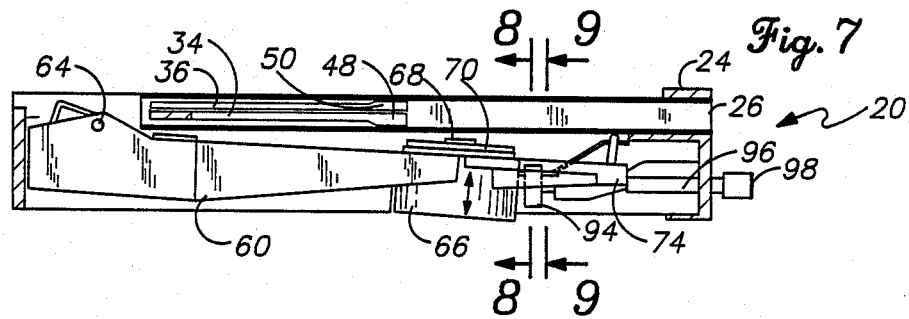
FIG. 7 is a section view taken along line 7—7 in FIG. 4, illustrating the mechanism for raising and lowering the drive mechanism.
Figure 8:
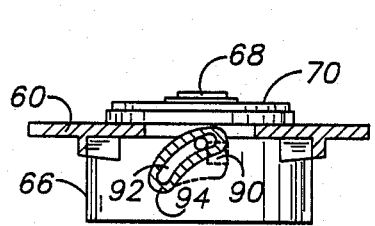
Figure 9:
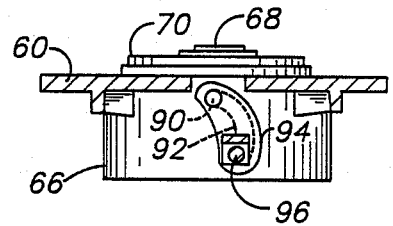
Figure 11:
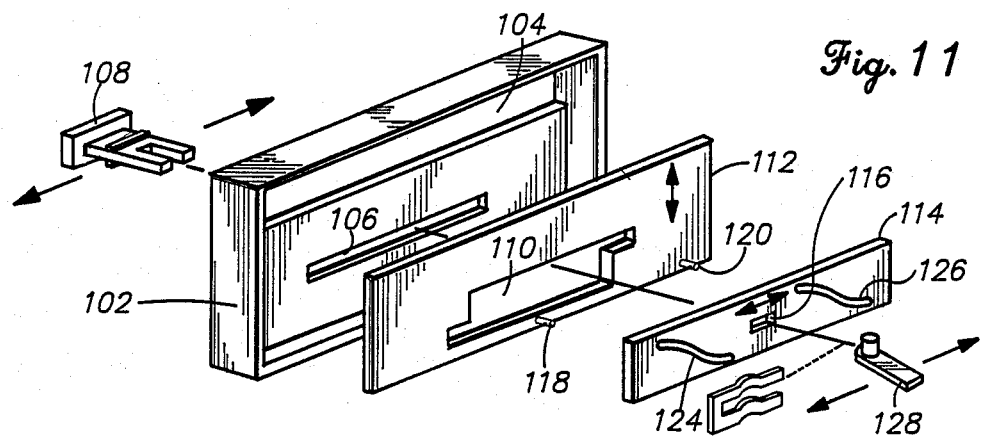
Figure 12:
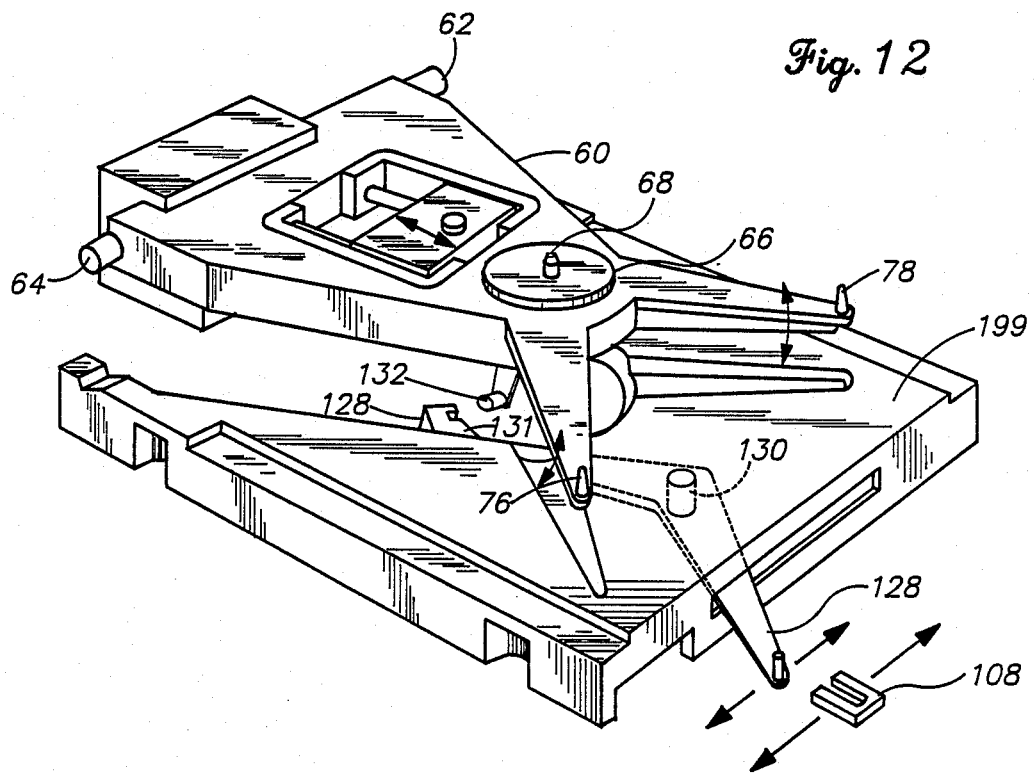
Figure 13:
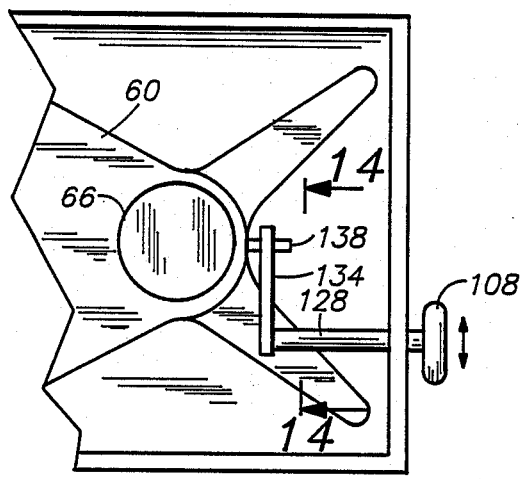
Figure 14:
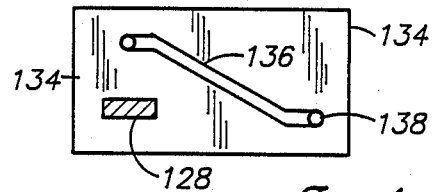
Figure 15:
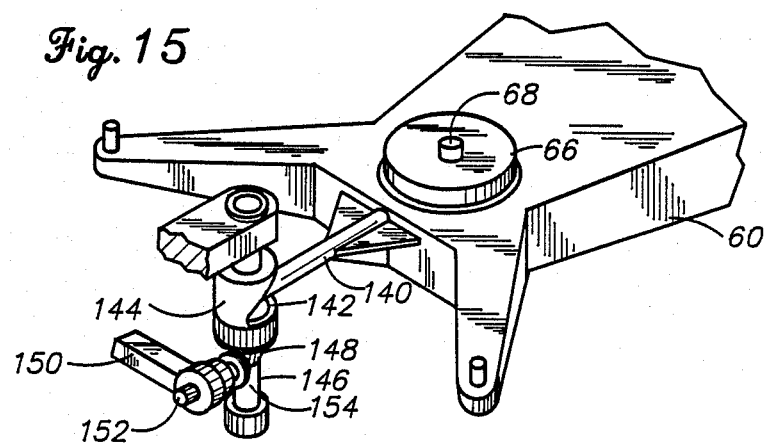
Figure 16:
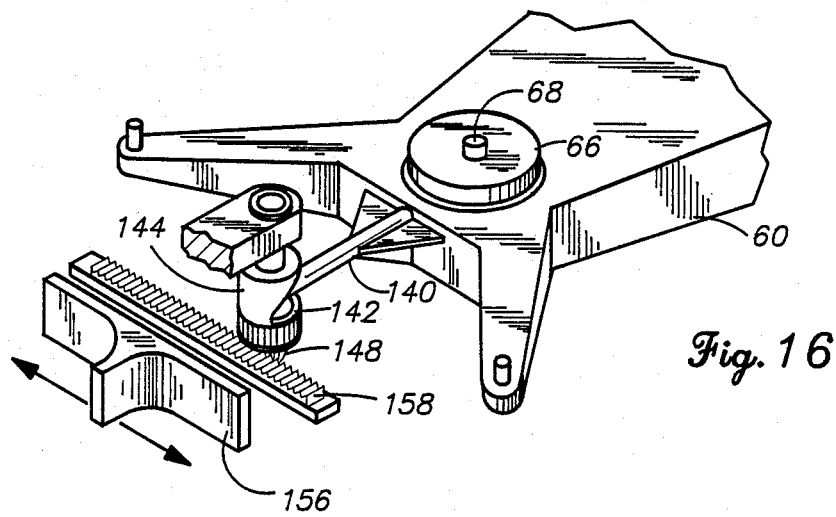

FIGS. 8 and 9 are section views taken at lines 8—8 and 9—9, respectively, in FIG. 7;

FIG. 10 is a view of a mechanism for engaging and positioning the cartridge, as shown in FIG. 7;

FIG. 11 illustrates an optional door mechanism for a disk drive according to the present invention;

FIG. 12 illustrates an optional mechanism for raising and lowering the drive mechanism;

FIGS. 13 and 14 illustrate another mechanism for raising and lowering the drive mechanism; and FIGS. 15 and 16 illustrate two other mechanisms for raising and lowering the drive mechanism.

Figure 4:
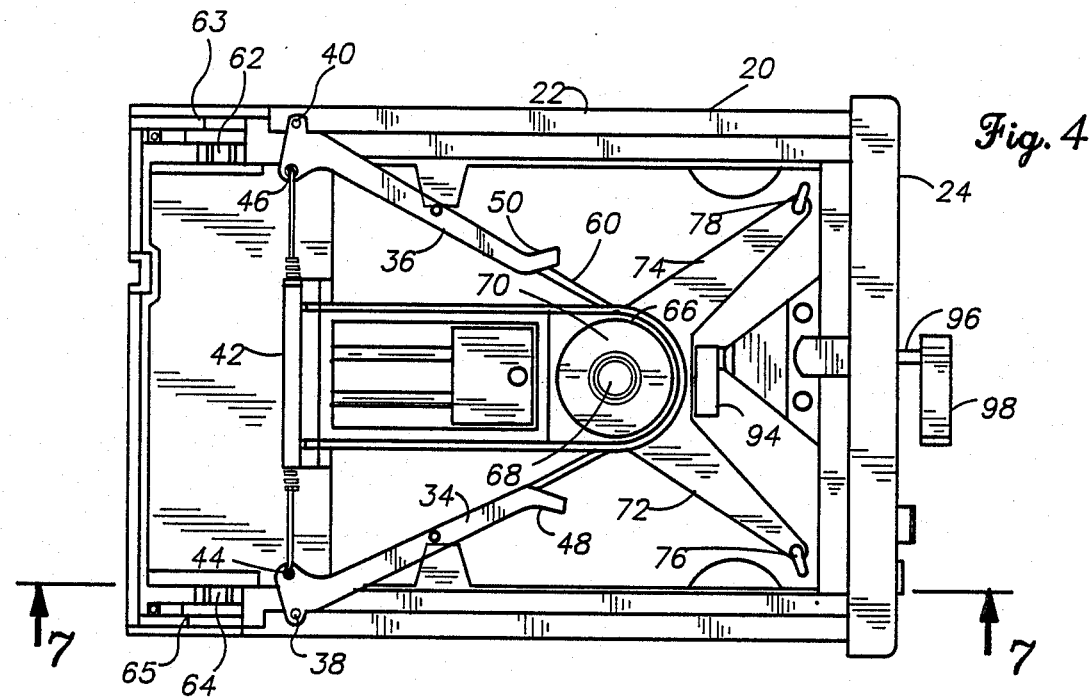
FIGS. 4, 5 and 6 are top views of the drive mechanism shown in FIG. 1, illustrating the disk cartridge in several steps of insertion.
Figure 5:
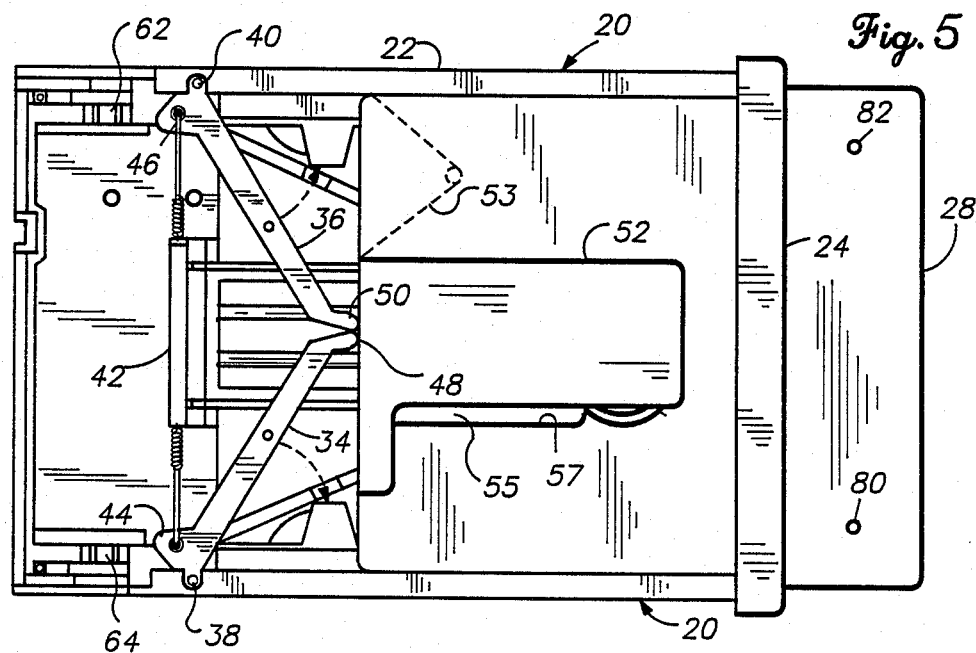

Referring to the drawings, and particularly to FIG. 1, there is illustrated a disk drive 20 in accordance with the presently preferred embodiment of the present invention. Drive 20 includes a frame 22 having a front plate 24. A slot receptacle 26 is provided in face plate 24 to receive a disk cartridge, illustrated generally at 28. Extrusions 30 and 32 form guides within the disk drive to receive the edges of cartridge 28 and to guide the cartridge into the drive. Arms 34 and 36 are pivotally mounted by pins 38 and 40 to frame 22, and are biased by tension spring 42 to the position illustrated in FIGS. 1 and 4. Spring 42 is fastened, at each end, to pins 44 and 46 on arms 34 and 36. Actuators 48 and 50 on arms 34 and 36 are arranged to engage the door of cartridge 28, as will be hereinafter explained.

Typically, the frame 22 will be enclosed within a cover (not shown) to protect the electronics, shown generally at 21, and the read/write heads, shown generally at 23. Push buttons and indicators 25 and 27 may be provided in face plate 24 to provide controls for the electronics and heads and to indicate their operation. Suitable feet or resilient mounting pads (not shown) may be mounted to receptacles 29.

As shown particularly in FIG. 2, the disk cartridge 28 includes a slide door 52 which may be slid (to the left in FIG. 2) to expose an opening in the top and bottom of the cartridge (not shown) to permit access to the rotatable disk media (not shown) within the cartridge housing. Slot 54 in slide door 52 is arranged to be engaged by one or the other of actuators 48 and 50 to slide the door from its closed to its open position, respectively. Slot 54 is laterally offset from the horizontal center of the cartridge housing so that it will be above or below the horizontal center, depending on the orientation of the cartridge housing. A spring (not shown) biases the door toward its closed position.

Figure 6:
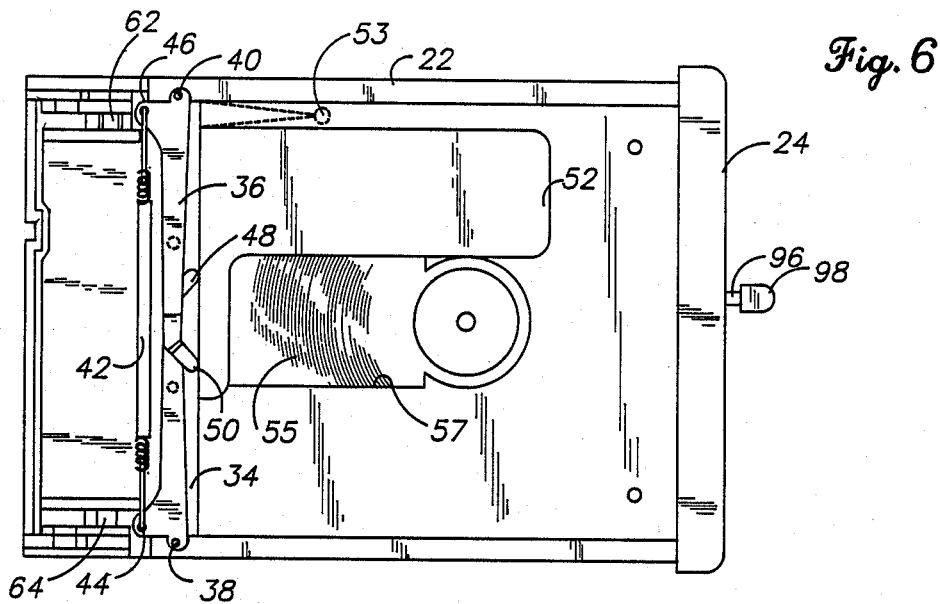

With reference particularly to FIGS. 1-6, as the disk cartridge 28 is inserted in slot receptacle 26 of the disk drive and guided by extrusions 30 and 32 to a position illustrated generally in FIG. 6, one or the other of actuators 48 and 50 engages slot 54 on the cartridge door. If the cartridge is in the orientation illustrated in FIG. 2 so that slot 54 is on the lower portion of the slide door, the lower actuator 48 will engage the slot. Continued insertion movement of the disk cartridge will force arm 34 to pivot, sliding the door to the left (in FIG. 2) as the cartridge is moved to past the position illustrated in FIG. 5 to the position illustrated in FIG. 6 against the bias of compression spring 53 (shown in dashed lines because it is inside the cartridge housing). Actuator 50 merely slides across the door without hampering the operation. Conversely, if the orientation of the disk is turned over, as might be desired in reading or writing on the opposite side of the disk, slot 54 will be oriented to the upper portion of the slide door and upper actuator 50 engages slot 54 to open the slide door. In either case, the disk media 55 is exposed to the read/write heads 23 through the opened door opening 57.

Support 60 is mounted by pins or shafts 62 and 64 to frrame 22. Springs 63 and 65 hold pins 62 and 64 into receiving slots within frame 22. Drive motor 66 is mounted to support 60 and includes a drive spindle 68 to adapted to engage the center hole of the disk (not shown) within cartridge 28. Magnetic ring 70 is provided to engage the disk in a manner to be hereinafter explained. Arms 72 and 74 (see particularly FIG. 4) carry engagement pins 76 and 78 arranged to engage apertures 80 and 82 in the disk cartridge 28 to hold the cartridge housing secure.

The support mechanism 60 is adapted to pivot on the mutual axis of pins 62 and 64 to move motor 66 from a disengaged position as shown in FIG. 7 to an engaged position whereby the spindle 68 engages the aperture (not shown) in the disk within cartridge 28. One mechanism for moving the motor and pivoting the support is illustrated particularly in FIGS. 8 and 9, wherein cam follower pin 90, mounted to support 60, engages an elliptical cam recess 92 of cam housing 94. Housing 94 is attached to knob shaft 96, which is rotated by rotation of knob 98. Rotation of knob 98 by 90° will force cam follower pin 90 to move within cam recess 92 of cam housing 94, thereby raising and lowering support 60.

In the operation of the apparatus, illustrated in FIGS. 1–9, the disk cartridge is inserted into opening 26 of the disk drive, and the slide door is opened by virtue of actuator 48 or 50. Knob 98 is rotated 90° bringing the motor spindle into engagement with the disk now exposed through the open door of the cartridge. The center hole of the disk is engaged by the spindle 68 of the motor, and magnetic ring 70 attracts a magnetic ring on the disk to clamp the disk to the ring. As the motor is raised to the disk, pins 76 and 78 engage apertures 80 and 82 in the cartridge housing (see FIG. 10) to secure cartridge 28 in its proper location.

FIG. 11 illustrates an optional door mechanism. Front plate 102 includes an aperture 104 for receiving the disk cartridge. Slot 106 is provided through which slide knob 108 is arranged to slide. The slide knob passes through opening 110 of door shutter 112 and is fastened to actuator plate 114 at opening 116. Cam follower pins 118 and 120 in shutter 112 engage S-shaped cam slots 124 and 126 in actuator plate 114. Conveniently, slide knob 108 may engage actuator arm 128 to raise and lower support 60, for example, using the mechanism illustrated in FIG. 12. As slide knob 108 is moved horizontally along the path defined by slot 106, actuator plate 114 also slides horizontally, carrying cam slots 124 and 126. Cam follower pins 118 and 120, engaged to slots 124 and 126, force shutter 112 upwardly or downwardly, as the case may be, to open and close opening 104.

FIG. 12 illustrates an alternative mechanism for raising and lowering support 60. In FIG. 12, actuator arm 128 is pivotally mounted to housing 22 at pivot 130 and includes a cam slide ramp 131 arrange to engage cam follower 132 on support 60 to raise and lower the motor mechanism and pivot support 60 about the pins 62 and 64.

FIG. 13 and 14 illustrate another alternative raising mechanism wherein cam plate 134 is attached to actuator arm 128 of slide knob 108. Cam plate 134 includes cam slot 136. Cam follower pin 138, attached to support 60, engages cam slot 136 to raise and lower support 60 as plate 134 is moved horizontally.

FIG. 15 shows another alternative raising mechanism wherein cam follower pin 140 engages cam slot 142 in cam 144. Bevel gear 148, fastened to cam 144, on shaft 146, engages bevel gear 154 on knob shaft 152. Knob 150 fastened to shaft 152 is rotated to cause rotation of cam 144 to force cam follower 140 to cause raising and lowering of support 60.

FIG. 16 is similar to FIG. 15 except that instead of bevel gear 154, shaft 152 and rotatable knob 150 in FIG. 15, slide knob 156 is fastened to rack gear 158 which engages bevel gear 148 to raise and lower support 60.

The present invention thus provides a mechanism for raising and lowering the drive mechanism of a disk drive into engagement with a cartridge, rather than the other way around. The mechanism is effective in operation and permits an even greater degree of compactness of a disk drive.

This invention is not to be limited by the embodiments shown in the drawings and described in the description, which are given by way of example and not of limitation, but only in accordance with the scope of the appended claims.

What is claimed is:

1. Apparatus for driving a disk comprising:
   disk drive having a frame;
   receiving means in said frame for receiving a disk cartridge;
   a disk cartridge having a first surface area, a disk therein and received in said receiving means;
   drive means for driving said disk in said disk cartridge wherein said drive means includes a spindle movable between an engaged position for rotating said disk and a disengaged position in which said disk is not rotated by said spindle;
   movable support means supporting at least said spindle, said movable support means and said spindle having a second surface area less than said first surface area; and
   means for moving said movable support means wherein at least portions of said spindle are moved outside of said cartridge to arrive at said disengaged position while said cartridge is in a substantially stationary position and wherein at least portions of said spindle are moved towards said cartridge to arrive at said engaged position.

2. Apparatus according to claim 1 wherein said support means includes pivot means pivotally mounted to said frame, and moving means operable to pivotally move said pivot means to move at least said spindle.

3. Apparatus according to claim 2 further including positioning means mounted to said pivot means for fixedly positioning said disk cartridge relative to said spindle when said spindle is in said engaged position.

4. Apparatus according to claim 3 wherein said positioning means comprises pins mounted to said pivot means adapted to engage apertures in said disk cartridge.

5. Apparatus according to claim 3 wherein said receiving means includes track means for engaging said disk cartridge to guide the cartridge in said frame.

6. Apparatus according to claim 2 wherein said moving means includes cam means supported within said frame, cam follower means mounted to said support means engaging said cam means, said cam means and cam follower means being so arranged that said cam follower means causes said support means to move between a lower position wherein said spindle is in said disengaged position and an upper position wherein said spindle is in said engaged position upon moving of said cam means between first and second cam positions, and motive means for moving said cam means between its first and second cam positions.

7. Apparatus according to claim 6 wherein said motive means comprises a rotatable knob, a first bevel gear fastened to said knob, a second bevel gear fastened to said cam means, said second bevel gear engaging said first bevel gear to move said cam means between its first and second cam positions upon rotation of said knob.

8. Apparatus according to claim 6 wherein said motive means comprises a rotatable knob, said cam means comprising cam housing fastened to said knob, said cam housing having a cam slot engaging said cam follower means.

9. Apparatus according to claim 6 wherein said motive means comprises a slide knob, a rack gear fastened to said knob, a bevel gear fastened to said cam means, said bevel gear engaging said rack gear to move said cam means between its first and second cam positions upon sliding of said knob.

10. Apparatus according to claim 2 wherein said disk cartridge has a door having a closed position and an open position, said disk being accessible to electronic means within said disk drive when said door is in its open position, said disk drive further including door opening means engaging said door to move it from its closed to its open position when said disk cartridge is inserted in said receiving means.

11. Apparatus according to claim 10 wherein said door has a receiver, said door opening means comprising an arm pivotally mounted to said frame, said arm having an actuator engaging said receiver on said door when said disk cartridge is inserted into said receiving means, said arm and actuator forcing open said door as said disk drive is inserted into said receiving means.

12. Apparatus according to claim 10 wherein said door includes a receiver laterally offset from the horizontal center of said disk cartridge as to be oriented in the upper or lower portion of the door depending on the orientation of the disk cartridge, bias means carried by said disk cartridge for biasing said door to its closed position, said door opening means comprising first and second arms pivotally mounted in said disk drive frame, a first actuator mounted to said first arm to engage said receiver when said disk cartridge is in a first orientation such that said receiver is above the horizontal center of the disk cartridge, and a second actuator mounted to said second arm to engage said receiver when said disk cartridge is in a second orientation opposite said first orientation such that said receiver is below the horizontal center of the disk cartridge, whereby upon insertion of a disk cartridge into said disk drive, one or the other of said first and second actuators engages said receiver so that continued insertion movement of the disk cartridge forces pivotal movement of the arm whose actuator engages said receiver causing the door to move from its closed to its open position against the bias of said bias means.

13. Apparatus according to claim 1 further including positioning means mounted to said support means for fixedly positioning said disk cartridge relative to said spindle when said spindle is in said engaged position.

14. Apparatus according to claim 13 wherein said positioning means comprises pins mounted to said support means adapted to engage apertures in said disk cartridge.

15. Apparatus according to claim 13 wherein said receiving means includes track means for engaging said disk cartridge to guide the cartridge in said frame.

16. Apparatus according to claim 1 wherein said disk cartridge has a door having a closed position and an open position, said disk being accessible to electronic means within said disk drive when said door is in its open position, said disk drive further including door opening means engaging said door to move it from its closed to its open position when said disk cartridge is inserted in said receiving means.

17. Apparatus according to claim 16 wherein said door has a receiver, said door opening means comprising an arm pivotally mounted to said frame, said arm having an actuator engaging said receiver on said door when said disk cartridge is inserted into said receiving means, said arm and actuator forcing open said door as said disk drive is inserted into said receiving means.

18. Apparatus according to claim 16 wherein said door includes a receiver laterally offset from the horizontal center of said disk cartridge as to be oriented in the upper or lower portion of the door depending on the orientation of the disk cartridge, bias means carried by said disk cartridge for biasing said door to its closed position, said door opening means comprising first and second arms pivotally mounted in said disk drive frame, a first actuator mounted to said first arm to engage said receiver when said disk cartridge is in a first orientation such that said receiver is above the horizontal center of the disk cartridge, and a second actuator mounted to said second arm to engage said receiver when said disk cartridge is in a second orientation opposite said first orientation such that said receiver is below the horizontal center of the disk cartridge, whereby upon insertion of a disk cartridge into said disk drive, one or the other of said first and second actuators engages said receiver so that continued insertion movement of the disk cartridge forces pivotal movement of the arm whose actuator engages said receiver causing the door to move from its closed to its open position against the bias of said bias means.

19. A method of engaging a spindle mechanism in a disk drive with a disk contained in a cartridge comprising:
inserting the cartridge in a first direction into the disk drive towards a stationary position, wherein the cartridge has a first surface area;
moving the spindle in a second direction towards the cartridge, said second direction being different from said first direction and wherein said spindle has a second surface area less than said first surface area; and
reaching an engaged position for rotating the disk using the spindle, wherein the cartridge moves substantially only in said first direction to arrive at said engaged position.

20. A method of engaging a spindle of a disk drive with a disk contained in a cartridge comprising:
inserting the cartridge into the disk drive, wherein the cartridge has a first surface area;
moving the spindle toward the cartridge from a disengaged position to an engaged position wherein there is substantial absence of movement of said cartridge toward said spindle while said spindle is moving into said engaged position, and wherein the spindle has a second surface area less than said first surface area.

21. Apparatus for driving a disk comprising:
a disk drive having a frame;
receiving means in said frame for receiving a disk cartridge;
a disk cartridge having a first surface area, a disk therein and received in said receiving means;
drive means for driving said disk in said disk cartridge wherein said drive means includes a spindle movable relative to said frame between an engaged position for rotating said disk and a disengaged position in which said disk is not rotated by said spindle;
movable support means operatively connected to said frame for supporting said spindle, wherein said movable support means and said spindle having a second surface area less than said first surface area; and
means for moving said movable support means relative to said frame wherein said spindle is moved towards said cartridge to arrive at said engaged position and away from said cartridge to arrive at said disengaged position.

22. A method of engaging a spindle of a disk drive with a disk contained in a disk cartridge comprising:
inserting the cartridge into the disk drive, wherein the cartridge has a first surface area; and
moving the spindle towards the cartridge from a disengaged position to an engaged position, wherein the spindle has a second surface area less than said first surface area.

* * * * *